United States Patent
Yuhan et al.

(10) Patent No.: US 9,438,599 B1
(45) Date of Patent: Sep. 6, 2016

(54) APPROACHES FOR DEPLOYMENT APPROVAL

(71) Applicant: Amazon Technologies, Inc., Reno, NV (US)

(72) Inventors: John Sandeep Yuhan, Seattle, WA (US); Jean-Paul Bauer, Seattle, WA (US); David Everard Brown, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/231,109

(22) Filed: Mar. 31, 2014

(51) Int. Cl.
*H04L 29/00* (2006.01)
*H04L 29/06* (2006.01)

(52) U.S. Cl.
CPC .......... *H04L 63/10* (2013.01); *H04L 63/0838* (2013.01); *H04L 63/0853* (2013.01)

(58) Field of Classification Search
CPC combination set(s) only.
See application file for complete search history.

(56) References Cited

U.S. PATENT DOCUMENTS

| | | | |
|---|---|---|---|
| 2006/0190987 A1* | 8/2006 | Ohta et al. | 726/1 |
| 2012/0110670 A1* | 5/2012 | Mont et al. | 726/25 |
| 2012/0303818 A1* | 11/2012 | Thibeault | G06F 9/5072 709/226 |

* cited by examiner

*Primary Examiner* — Ghazal Shehni
(74) *Attorney, Agent, or Firm* — Hogan Lovells US LLP (57) ABSTRACT

A deployment approval system receives, from a deployment tool, a deployment request for performing a deployment to a particular resource. The deployment approval system can identify at least one rule for approving or rejecting the deployment request based on one or more criteria. The deployment approval system can determine whether the deployment request satisfies the one or more criteria in the at least one rule to approve or reject the request. If the deployment request is approved, the deployment approval system sends an approval to the deployment tool to perform the deployment. The deployment tool can then perform the deployment and, once the deployment is complete, the deployment approval system can receive a confirmation of the deployment. The deployment approval system can then store data describing the deployment in an audit repository.

20 Claims, 8 Drawing Sheets

APPROACHES FOR DEPLOYMENT APPROVAL

BACKGROUND

As an increasing number of applications and services are being made available over networks, such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Instead, the hardware and/or software needed to provide access to such resources is maintained by a resource provider. The resource provider is typically tasked with the responsibility of keeping these resources up-to-date. Such upkeep can involve, among other things, installing or upgrading software, maintaining resource configurations, applying software patches, etc. This responsibility can increase the burden on the resource provider to ensure that such resources are performing optimally while also ensuring that customers or end-users do not experience unnecessary performance issues that can arise during such day-to-day maintenance.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing resources in an electronic provider environment. In particular, various embodiments regulate deployment tools that seek to deploy, e.g., deploy software, on resources according to rules specified in deployment policies. In particular, the deployment tools can be configured to seek approval for each deployment through a deployment approval system before performing the deployment. As used herein, deployment refers to any type of mutation to a particular resource. Some examples of resources include both physical and virtual instances of computing devices, e.g., servers, that include at least one central processing unit (CPU), memory, storage, and networking capacity. For example, a server acting as a host machine can be treated as one resource while a provisioned instance, e.g., a virtual machine image, of a particular application server and/or relational database running on the host machine can be treated as a separate resource. Mutation of a particular resource can involve making a change to some aspect of the resource, including, for example, modifying an operating system, production data, software, a configuration, a code flow, or a database, e.g., database table, that is running on the resource. Such mutations typically involve making changes to the resources that affect the operation of those resources and, as a result, also affect the customers of those resources.

As mentioned above, a resource provider might provide a set of resources of one or more types that are able to be utilized by multiple clients, such as may be part of a multi-tenant, shared resource, or "cloud" offering. From time to time, changes to this set of resources may be needed. Conventional approaches can deploy to such resources using deployment tools, e.g., shell scripts that, when executed, will access the target resources and make the desired changes. For example, the deployment tools may make changes to production data, install or upgrade software, apply a new configuration, e.g., a new Domain Name Service (DNS) configuration, apply patches to software that already exists on the resources, etc. Thus, at any given time, there may be multiple deployment tools that are accessing the resources to perform some type of deployment. Allowing multiple deployments by different deployment tools to a resource at or around the same time can result in that resource operating in an undesirable or unexpected manner. Similarly, allowing a deployment to multiple resources, regions (virtual or geographic), or zones, e.g., zones of resources within regions, without having tested the deployment can also result in undesirable or unexpected consequences. For example, if an authorized entity deploys a software patch to multiple regions of resources at the same time, then any unforeseen consequences arising from applying that software patch will typically affect all of the multiple regions of resources. In extreme cases, this may result in the multiple regions being rendered inoperable.

Approaches in accordance with various embodiments provide the ability to deploy to particular resources by requiring deployment tools, e.g., shell scripts or various types of deployment software, to interact with a deployment approval system that first approves the deployment being sought by the deployment tools prior to any deployment to the particular resources. The deployment approval system can determine whether to approve or deny a deployment by evaluating the deployment with respect to various rules that are specified in deployment policies. For example, one rule may specify that a deployment to resources in a first region cannot occur while a deployment to resources in a second region is in effect. As a result, the deployment approval system is able to control and throttle deployments, for example, to various resources, regions (virtual or geographic), or zones based on various rules.

Various other applications, processes and uses are presented below with respect to the various embodiments.

Figure 1:
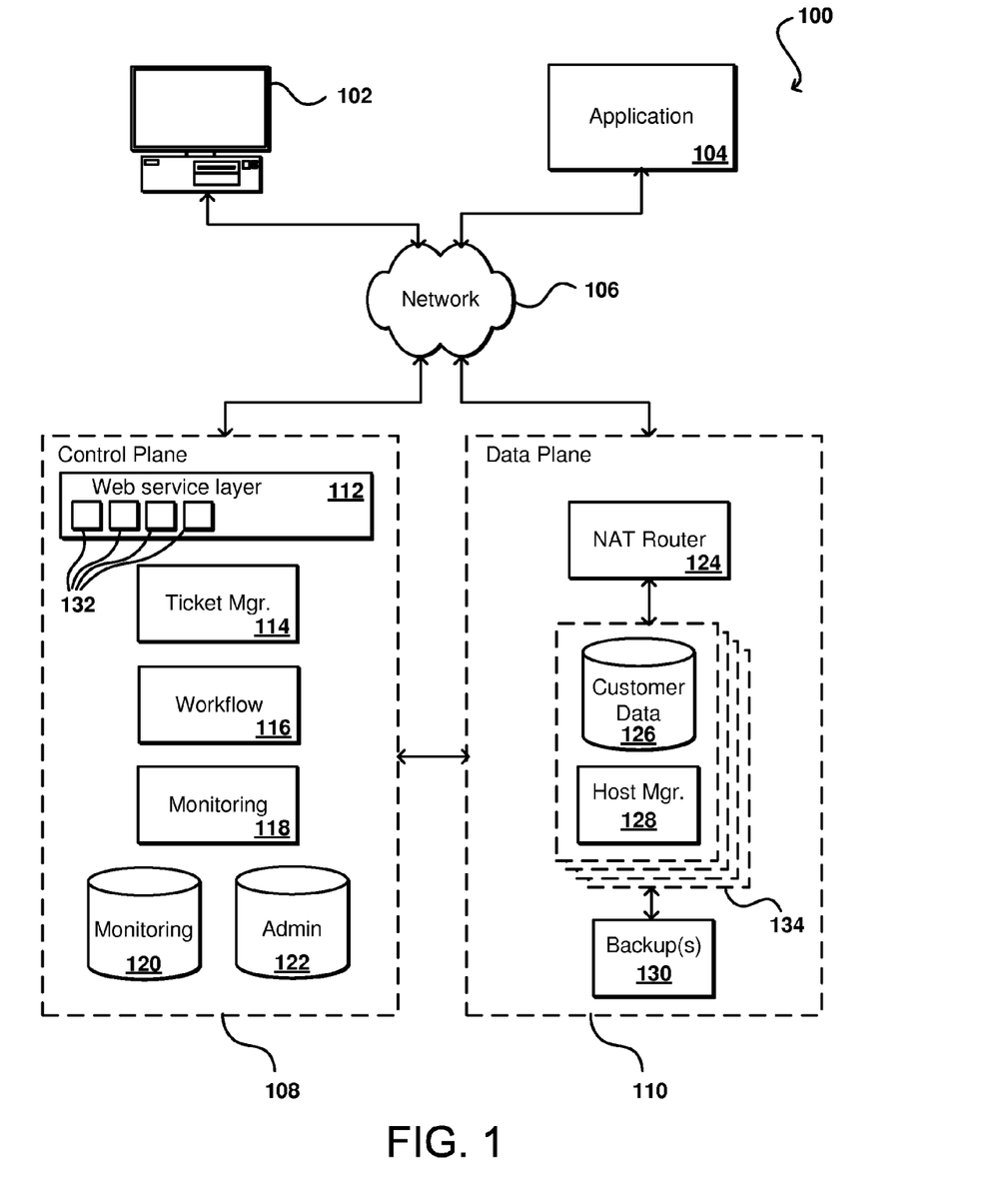
FIG. 1 illustrates an environment in which various embodiments can be implemented.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, relational databases, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task, e.g., to update software on a server of the data plane 110. The user or an application 104 in many instances can access the resource for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 108 in this example is essentially a virtual layer of hardware and software components that handles control and management actions, e.g., provisioning, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web service calls or requests through the network 106. Each API can be provided to receive requests for at least one specific action to be performed with respect to the data environment, e.g., to provision, scale, clone, or hibernate an instance of a relational database. Upon receiving a request to one of the APIs 132, the Web services layer can parse or otherwise analyze the request to determine the steps or actions that are needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features, e.g., authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "ticket manager" component 114. A ticket manager component can be any appropriate component operable to determine any tasks to be executed in response to an outstanding request. In this example, the Web services layer might place instructions or information for a request in a job queue, and the ticket manager can identify the outstanding request and determine any tasks corresponding to the request. Various other approaches can be used as would be apparent to one of ordinary skill in the art, such as the Web services layer sending a notification to a ticket manager that a job exists. The ticket manager component can identify the request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks, including, for example: repository creation, modification, and deletion; recovery and backup; security group creation, deletion, and modification; user credentials management; and key rotation and credential management. Such workflows can be implemented on top of a workflow service, as discussed elsewhere herein.

An example workflow for a customer might include tasks, e.g., provisioning a data store instance, allocating a volume of off-instance persistent storage, attaching the persistent storage volume to the data store instance, then allocating and attaching a Domain Name Service (DNS) address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, e.g., deleting, creating, or modifying one of more data store instances, such as to increase storage. In some embodiments, the workflow information is written to storage, and at least one separate execution component pulls, or otherwise accesses or receives, tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task, a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager 128 can reply to the service. The reply can provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When a data instance is created in the data plane, information for the instance can be written to a data store in the control plane, e.g., a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, e.g., collecting log and/or event information from multiple components of the control plane and/or data plane, e.g., the Web service layer 112, workflow component 116, ticket manager component 114, and various host managers. Using such event information, the monitoring component can expose customer-visible events, for various purposes, including, for example, implementing customer-facing APIs. A monitoring component can constantly monitor the health of all the running repositories and/or instances for the control plane, detect the failure of any of these instances, and initiate the appropriate recovery process(es).

Each instance 134 in the data plane can include at least one data store 126 and a host manager component 128 for the machine providing access to the data store. A host manager in one embodiment is an application or software agent executing on an instance and/or application server, e.g., a Tomcat or Java application server, programmed to manage tasks, e.g., software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades for the data store and/or operating system. A host manager also can collect relevant metrics, such as may relate to CPU, memory, and I/O usage.

The monitoring component can communicate periodically with each host manager 128 for monitored instances 134, e.g., by sending a specific request or by monitoring heartbeats from the host managers, to determine a status of each host. In one embodiment, the monitoring component includes a set of event processors (or monitoring servers) configured to issue commands to each host manager, e.g., to get the status of a particular host and/or instance. If a response is not received after a specified number of retries, then the monitoring component can determine that there is a problem and can store information in the Admin data store 122 or another such job queue to perform an action for the instance, e.g., to verify the problem and re-provision the instance, if necessary. The ticket manager 114 can access this information and kick off a recovery workflow for the instance to attempt to automatically recover from the failure. The host manager 128 can act as a proxy for the monitoring and other components of the control plane, performing tasks for the instances on behalf of the control plane components. Occasionally, a problem will occur with one of the instances, e.g., the corresponding host, instance, or volume crashing, rebooting, restarting, etc., which cannot be solved automatically. In one embodiment, a logging component can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although, in some embodiments, this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 110 to directly interact with that instance 134. In one embodiment the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, and can have at least one backup instance or copy in persistent storage 130. Using such an approach, once the instance has been configured through the control plane, a user, application, service, or component can interact with the instance directly through requests to the data plane, without having to access the control plane 132. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

As discussed, however, there may be various deployment tools that are configured to perform deployments on resources in the resource provider environment 100. Even if individual deployment tools are configured to abide by certain restrictions, e.g., time periods during which the deployment tool can be executed, at any given time, there may be multiple deployment tools that are attempting to perform some type of deployment. As explained above, allowing such deployments to occur on resources in an uncontrolled manner can result in undesirable or unexpected consequences.

Figure 2:
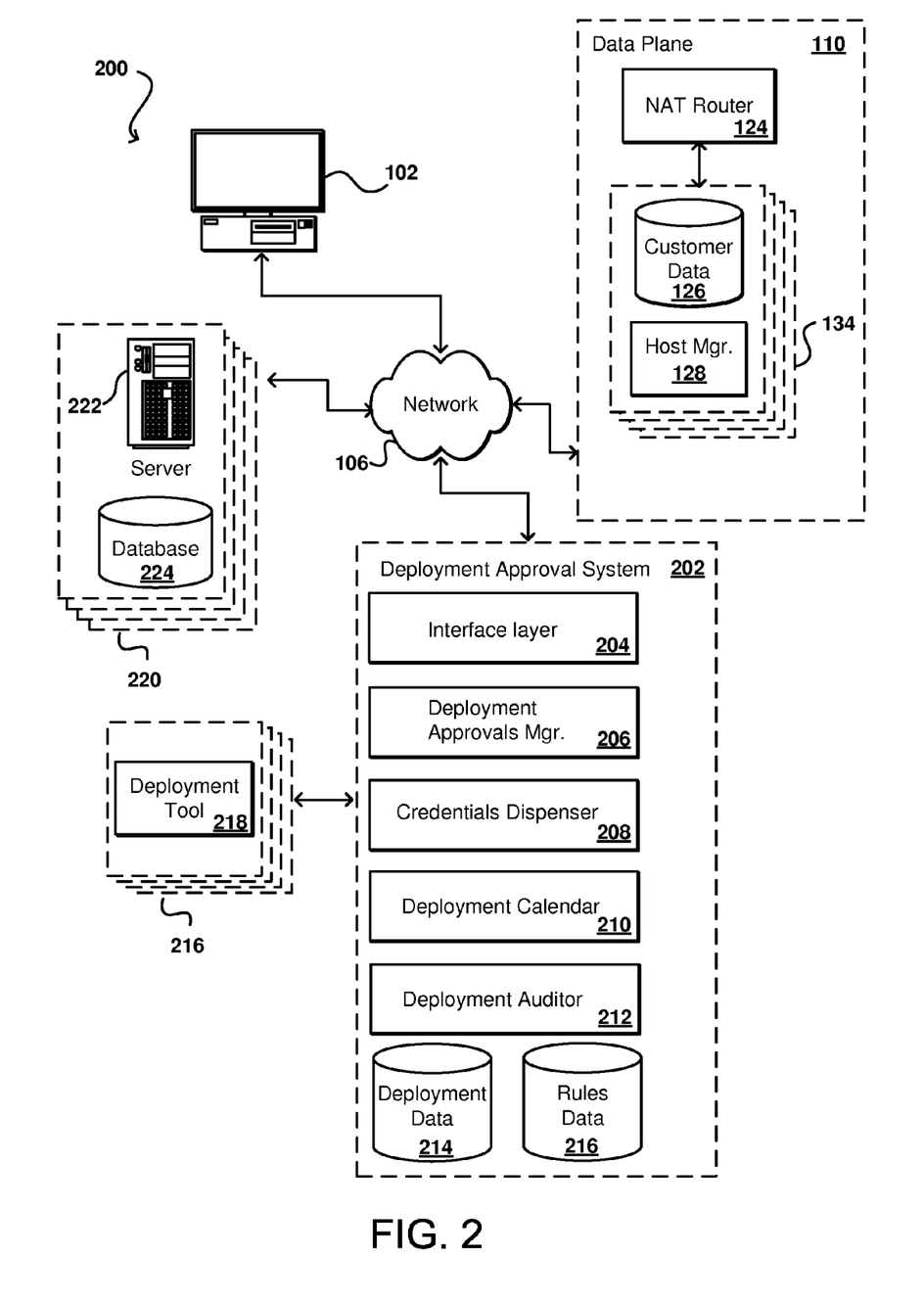
FIG. 2 illustrates an example set of components that can be used to enforce a deployment approval service in accordance with various embodiments.

One way to control such deployments is through a deployment approval system 202, as illustrated in the example of FIG. 2. In various embodiments, the deployment approval system 202 includes an interface layer 204 that is configured to receive deployment requests from various deployment tools 216. The deployment system 202 also includes a deployment approvals manager 206 that can approve or reject deployments being sought by deployment tools 216 by evaluating the deployment request with respect to various rules 216 that have been defined by authorized entities. For example, a deployment tool 218 can be configured to obtain approval for a deployment on an instance 134 in a resource provider environment from the deployment approval system 202. The deployment in the instance 134 can occur on any mutable aspect of the instance 134 including, for example, an operating system, production data, software, or a database. This example references the instance 134 for purposes of illustration. However, the deployment approval system 202 can be configured to approve or reject deployments to any type of resource, or groups of resources, in various environments including, but not limited to, deployments to various computing devices, servers 222, or databases 224. Further, the deployment can target any particular mutable aspect of the resource including, but not limited to, an operating system, data stored in the resource, software, or a database that is running on the resource.

The deployment approvals manager 206 is configured to generally approve a deployment, for example, a deployment to a group of resources, provided that the deployment satisfies one or more rules that are associated with the group of resources. In some embodiments, once the deployment is approved, the deployment approvals manager 206 authorizes the deployment tool 218 to perform the deployment, for example, by providing the deployment tool 218 with a credential or token, e.g., a one-time password (OTP), that allows the deployment tool 218 to access the group of resources to perform the deployment.

Naturally, the deployment approvals manager 206 will generally reject the deployment if the deployment fails to satisfy one or more of the rules associated with the group of resources. In some embodiments, upon rejecting the deployment, the deployment approvals manager 206 can provide the deployment tool 218 with information indicating why the rejection was issued. This information can include, for example, a listing of rules that the deployment failed to satisfy. An entity operating the deployment tool 218 can then evaluate the information to make adjustments to the deployment tool 218 so that another attempt at completing the deployment can be made. For example, if the information indicates that the deployment tool 218 attempted to perform the deployment during an unauthorized time period, then the entity operating the deployment tool 218 can configure the deployment tool 218 to execute during an authorized time period.

Approaches in accordance with various embodiments can permit authorized entities to configure the deployment approval system 202 through the interface layer 204 to approve or deny deployments by defining specific rules that generally must be satisfied before a certain deployment will be permitted. Each rule can be defined as a general rule, e.g., a rule that is applied to all deployment requests received by the deployment approval system 202. Alternatively, a rule can be defined as a specific rule that is applied by the deployment approval system 202 to deployment requests that target a particular resource, group of resources, region, or zone.

As used herein, a "rule" refers to a set of explicit criteria or logical conditions that need to be satisfied before a particular operation, e.g., deployment, can be performed. For example, various rules can define criteria or conditions that that will govern the conduct of deployment tools with respect to a resource, groups of resources, a region, or zone.

As described, rules can be associated with particular resources, groups of resources, regions, or zones. In such implementations, any deployment targeting the particular resources, groups of resources, regions, or zones, must generally satisfy all respective rules that are associated with the particular resources, groups of resources, regions, or zones. However, rules can also be associated with certain operations that are performed by the deployments. For example, if a deployment involves deleting files in various resources, then the rule for the "delete" operation must be satisfied before the deployment will be allowed.

The rules can be generated by authorized entities using the techniques described in this specification. Copies of the rules can also be stored in the rules repository 216, among other appropriate locations. The rules repository 216 can store all of the rules that have been created by authorized entities to approve or reject deployment requests received from various deployment tools. Thus, when a deployment request is received, the deployment approvals manager 206 can evaluate the deployment request with respect to rules that are applicable to the request, as determined based on which resources the deployment request is targeting, for example. Moreover, when evaluating the deployment request, the deployment approvals manager 206 can evaluate information describing previously attempted or performed deployments stored in the deployment repository 214. Further, when evaluating the deployment request, the deployment approvals manager 206 can also refer to a deployment calendar 210 that includes a schedule indicating when certain deployments are or are not permitted or when certain deployments are scheduled. Thus, if a deployment request is seeking to perform a deployment on resource A on Sunday between 4 pm and 6 pm, and the deployment calendar 210 indicates that this time slot is blocked off for maintenance, then the deployment request will be rejected.

For example, an authorized entity, e.g., a systems administrator, can create a time-based rule that permits a deployment, e.g., software upgrade, during a particular time period, e.g., Wednesdays between 8 pm and 12 am, on certain resources, groups of resources, regions, or zones. In another example, the authorized entity can create a time-based rule that specifies when a deployment may not occur on resources in a particular region, e.g., the U.S. East-1, during local business hours, e.g., 9 am-6 pm.

As mentioned above, the authorized entity can create the rule by interacting with the deployment approval system 202 through an interface layer 204, e.g., a graphical user interface (GUI) or an application programming interface (API). The authorized entity can create and specify various attributes for the rule. For example, an authorized entity can interact with the GUI to create the rule by specifying, for example, attribute-value pairs, various explicit criteria, or logical conditions. In some embodiments, the rule is defined using one or more attribute-value pairs that are stored in a machine-readable format, e.g., a JavaScript Object Notation (JSON).

For example, to generate the time-based rule, the authorized entity can specify a name of, or a reference to, a target resource, groups of resources, region, or zone. The rule can also specify a start time indicating when deployments can be performed on the target resource and an end time indicating when deployments can no longer be performed on the target resource.

Other types of rules are possible. A different type of rule is a dependency-based rule that specifies one or more conditions that generally must be satisfied before a deployment request will be approved. For example, one condition may be that a deployment targeting a particular resource, group(s) of resources, regions, or zones will only be approved if the deployment successfully completes on a different resource, group(s) of resources, regions, or zones. Further, another condition may specify a minimum time buffer that is required between deployments. Another example condition may be that the deployment must first successfully be applied to resources in one region, e.g., Australia, before the deployment can be performed on resources in a different region, e.g., United States.

Another type of rule is an exclusion rule that can be used to exclude one or more resources, groups of resources, regions, or zones that from a deployment. For example, a particular software deployment to multiple regions may need to satisfy an exclusion rule that prevents the deployment to multiple zones at the same time. Instead, the exclusion rule may specify that the deployment must occur for each zone separately, that there must be a specified waiting period between deployments, e.g., wait one day between each deployment before deploying to the next zone. Other types of rules include a user authentication rule that specifies which users are permitted to perform a particular deployment. An approval rule can be used to specify one or more other approval systems that must first approve a deployment before the deployment is approved by the deployment approvals manager 206. A large scale event (LSE) detection rule can be used to approve or reject a deployment depending on one or more large-scale events. For example, a large scale event can be an event that causes a significant outage, such as a power outage that impacts one or more datacenters. In response, an authorized entity can manually create an LSE rule that rejects all deployments for any given resource, group(s) of resources, region(s), or zone(s), until the LSE rule has been manually deactivated by the authorized entity.

A metrics-based rule can be used to approve or reject a deployment based on the status of one or more metrics. For example, the metrics can correspond to the resources to which the deployment is directed, to various metrics corresponding to a network through which the deployment is received, or metrics corresponding to the deployment approval system 202. For example, if the latency for an API call sent to the deployment approval system 202 does not satisfy a threshold, then the deployment approval system 202 can rejection deployments for a particular period of time or until the latency satisfies the threshold.

In some embodiments, the deployment approval system 202 is configured to provide the deployment tool 218 with a token that grants the deployment tool 218 with access to target resources so that the deployment can be performed. Once the deployment is complete, the deployment tool 218 can return the token to the deployment approval system 202 or the token can simply expire once the deployment is complete or after a period of time. In such embodiments, token-based rules can be used to approve or reject deployments depending on whether the deployment tool requesting the deployment possesses a valid token.

For example, one rule can specify that only one deployment tool can deploy to resource A at any given time. In this example, a first deployment tool can request a deployment on resource A through the deployment approval system 202. In response, the deployment approval system 202 can provide the first deployment tool with a token authorizing the first deployment tool to deploy to resource A. During this time, a second deployment tool can also request a deployment on resource A through the deployment approval system. Since the deployment approval system 202 has already provided the token to the first deployment approval tool, the deployment approval system 202 will reject the request received from the second deployment tool until the first deployment tool returns the token. Naturally, multiple rules can apply to a particular deployment request, each of which generally must be satisfied before the deployment request is permitted.

In some embodiments, the credentials dispenser 208 is configured approve deployments by providing the deployment tool 218 with credentials, e.g., access keys or secret keys, for accessing resources being targeted by the deployment. These credentials can be provided by evaluating applicable rules in the rules repository 216, as described above. For example, if the deployment tool 218 has been granted credentials to deploy to a database in a first region, and a rule indicates that the same deployment cannot occur in a second region until a particular period of time has passed since the first deployment, then the credentials dispenser 208 will not provide the deployment tool 218 with credentials to access resources in the second region until that particular period of time has passed. In some embodiments, the credentials dispenser 208 is configured provide a user operating the deployment tool 218 with credentials, e.g., password, for accessing resources being targeted by the deployment so that the user can manually perform the deployment.

The credentials dispenser 208 can be configured to provide the deployment tool 218 with access to individual resources, group(s) of resources, regions, and/or zones on an as-needed basis for a deployment or mutation. This need can be determined based on access rights for the entity that is associated with the deployment or mutation being performed. For example, the need can be determined based on whether the entity ranks in an applicable organization chain. Further, in some embodiments, the credentials dispenser 208 can be accessed to perform audits including, for example, which credentials have been issued and the respective access rights associated with those credentials. The credential dispenser 208 can also include an andon feature that can be activated by authorized entities to disable or suspend some or all of the credentials that have been issued. Depending on the implementation, the credentials dispenser 208 can dispense self-expiring one-time passwords (OTPs), for example, to users or deployment tools, to provide access to various resources. In other words, the credentials dispenser 208 can be used to authorize certain users or deployment tools with authorization to perform specific actions or deployments to various resources, groups of resources, regions, or zones, as described in this specification. This access to users and deployment tools can be restricted to certain time periods, as determined based on various access or organization policies.

Deployment tools 216 can be configured to interact with the deployment approval system 202, for example, through one or more APIs provided through the interface layer 204. For example, one example API call can allow a deployment tool 218 to request approval from the deployment approval system 202 for a particular deployment. Another example API call can permit the deployment tool 218 to report to the deployment approval system 202 when a deployment has been performed. These API calls will typically specify various values including, for example, information about the deployment. This information can include the deployment type, e.g., which deployment tool(s) are requesting the deployment, the destination, e.g., a name or reference to a resource, group(s) of resources, region(s), and/or zone(s), a payload, e.g., software packages being deployed, a name or identifier of deployment technicians that are requesting the deployment, a unique deployment identifier that can be used to determine details about the deployment, for example, for auditing purposes, other metadata that describes information that may need to be archived for debugging or auditing purposes. Further, the deployment approval system 202 includes an override operation accessible to authorized entities, e.g., through an Application Programming Interface (API), for purposes of overriding any or all rules being evaluated by the deployment approval system 202.

The deployment approval system 202 can also include a deployment auditor 212 that is configured to record information about deployment that have been approved or rejected by the deployment approvals manager 206. The deployment auditor 212 will generally have a record of every deployment or mutation that has been performed by deployment tools 218 including, for example, the deployment type, e.g., which deployment tool(s) requested the deployment, the destination, e.g., a name or reference to a resource, group(s) of resources, region(s), and/or zone(s), the payload, e.g., changes made or software packages deployed, and the name(s) or identifier(s) of deployment technicians that requested the deployment. Authorized entities can interact with the interface layer 204 to access audit information recorded by the deployment auditor 212.

Figure 3:
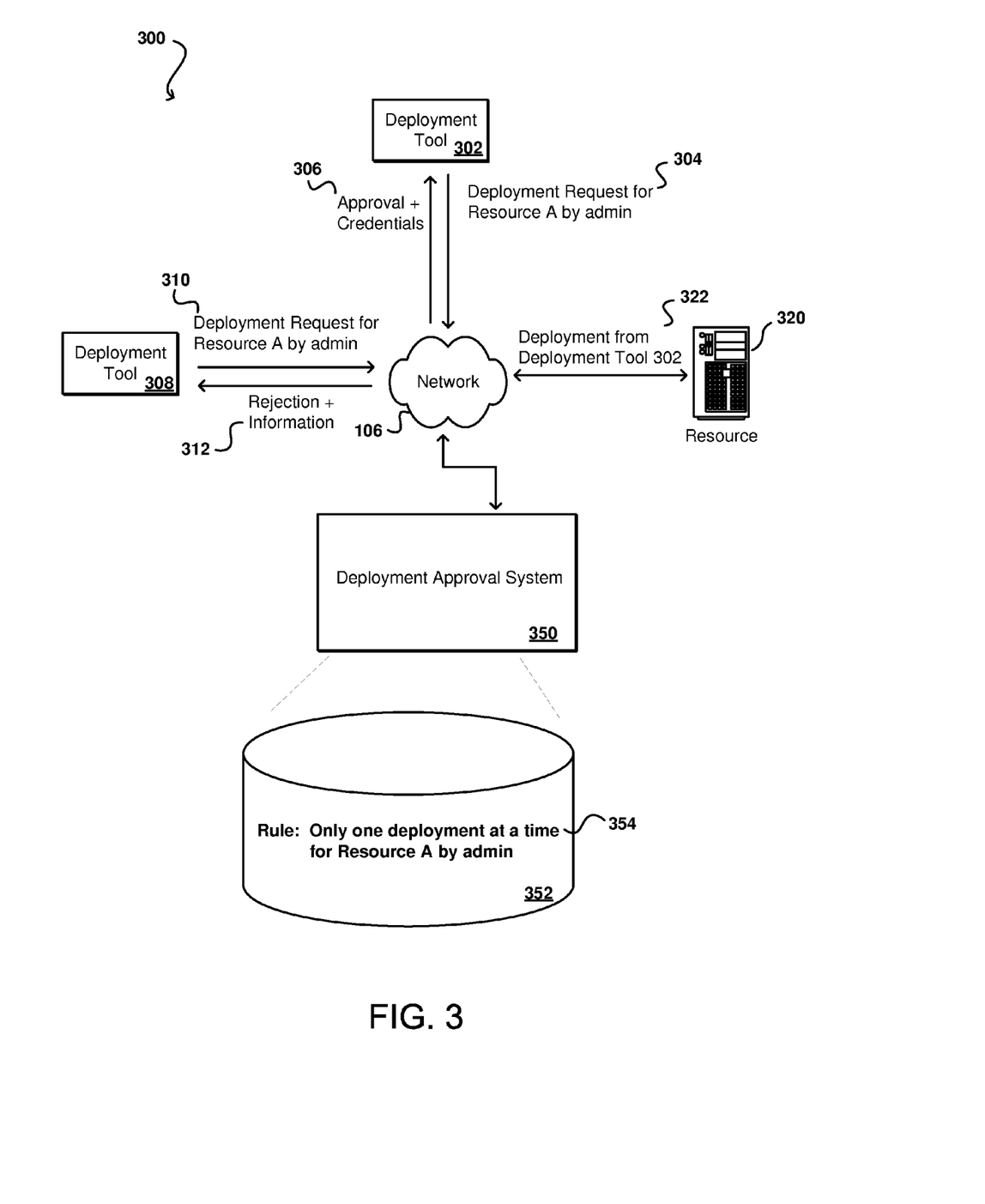
FIG. 3 illustrates a set of example components that can be utilized to implement such an approach in accordance with various embodiments.

FIG. 3 illustrates a set of example components 300 that can be utilized to implement such an approach in accordance with various embodiments. The example components 300 include a first deployment tool 302, a second deployment tool 308, a resource 320, and a deployment approval system 350, e.g., the deployment approval system 202, as described in reference to FIG. 2. Each of the components 300 is able to communicate with one another through the network 106, e.g., the Internet.

In this example, the first deployment tool 302 being operated by a user "admin" is attempting to obtain approval for a deployment request 304 for a Resource 320 through the deployment approval system 350. Additionally, the second deployment tool 308 also being operated by the user "admin" is attempting to obtain approval for a different deployment request 310 for the Resource 320 through the deployment approval system 350.

As described above, the deployment approval system 350 can approve or reject deployment requests based on rules stored in a rules repository 352, e.g., the rules repository 216, as described in reference to FIG. 2. In the example of FIG. 3, the rules repository 352 includes a rule 354 that only permits one deployment at a time on the Resource 320 by deployment tools associated with the user "admin." In FIG. 3, the deployment approval system 350 has received the deployment request 304 before the deployment request 310. Upon receiving the deployment request 304, the deployment approval system 350 evaluates the rule 354 and determines that the deployment request 304 satisfies the rule 354 and sends, through the network 106, an approval 306 for the deployment to Resource 320. As described above, in some embodiments, the deployment approval system 350 also sends credentials 306 for accessing the Resource 320 for purposes of the deployment. The deployment tool 302 can then use the credentials 306 to access the Resource 320 over the network 106 to perform the deployment 322.

Upon receiving the deployment request 310, the deployment approval system 350 evaluates the rule 354 and determines that the deployment request 310 does not satisfy the rule 354 since the deployment 322 is already in progress and, consequently, sends, through the network 106, a rejection 312 for the deployment. In some embodiments, as described above, the deployment approval system 350 also sends information 312 providing details for the rejection 312 including, for example, a listing of rules, e.g., rule 354, that were violated.

Figure 4:
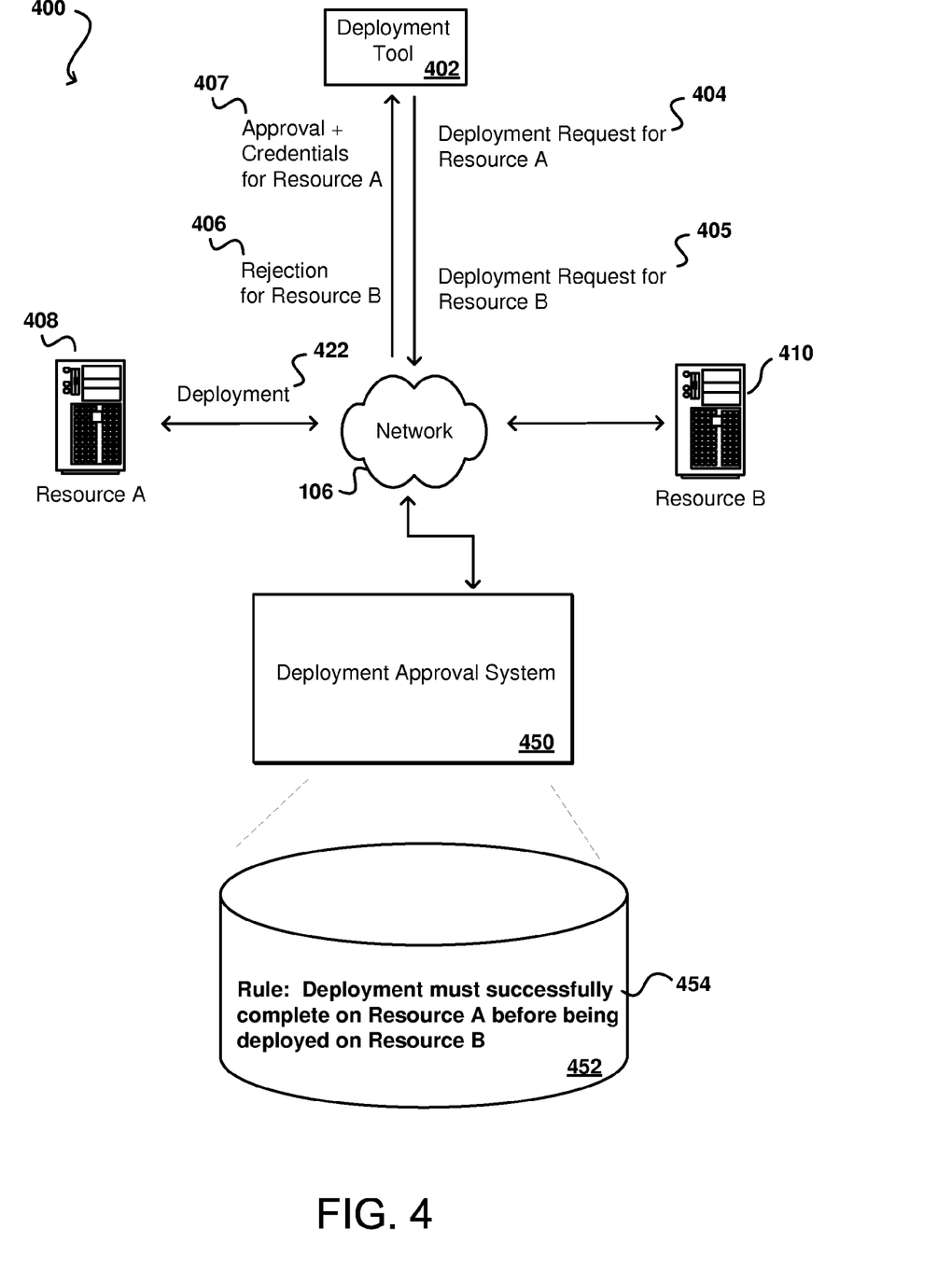
FIG. 4 illustrates a set of example components that can be utilized to implement such an approach in accordance with various embodiments.

FIG. 4 illustrates a set of example components 400 that can be utilized to implement such an approach in accordance with various embodiments. The example components 400 include a deployment tool 402, a Resource A 408, a Resource B 410, and a deployment approval system 450, e.g., the deployment approval system 202, as described in reference to FIG. 2. Each of the components 400 is able to communicate with one another through the network 106, e.g., the Internet.

In this example, the deployment tool 402 is attempting to obtain approval for a deployment request 404 for a Resource A 408 through the deployment approval system 450. Additionally, the deployment tool 402 is also attempting to obtain approval for a different deployment request 405 for Resource B 410 through the deployment approval system 450. In this example, both deployment request 404 and deployment request 405 are carrying the same payload, for example, the same software package to be installed.

The deployment approval system 450 is able to approve or reject deployment requests based on rules stored in a rules repository 452, e.g., the rules repository 216, as described in reference to FIG. 2. In the example of FIG. 4, the rules repository 452 includes a rule 454 that requires that a deployment successfully complete on Resource A 408 before that deployment can be performed on Resource B 410. In FIG. 4, the deployment approval system 450 has received the deployment request 405 before the deployment request 404. Upon receiving the deployment request 405, the deployment approval system 450 evaluates the rule 454 and determines that the deployment request 405 does not satisfy the rule 454 since the deployment request 405 is attempting to deploy to Resource B 410 before the deployment successfully completes on the Resource A 408. Consequently, the deployment approval system 450 sends, through the network 106, a rejection 406 for the deployment request 405.

Upon receiving the deployment request 404, the deployment approval system evaluates the rule 454 and determines that the deployment request 404 does not violate the rule 454 and sends, through the network 106, an approval 407 for the deployment to Resource A 408. As described above, in some embodiments, the deployment approval system 450 also sends credentials 407 for accessing the Resource A 408 for performing the deployment. The deployment tool 402 can then use the credentials 407 to access the Resource A 408 over the network 106 to perform the deployment 422.

Figure 5:
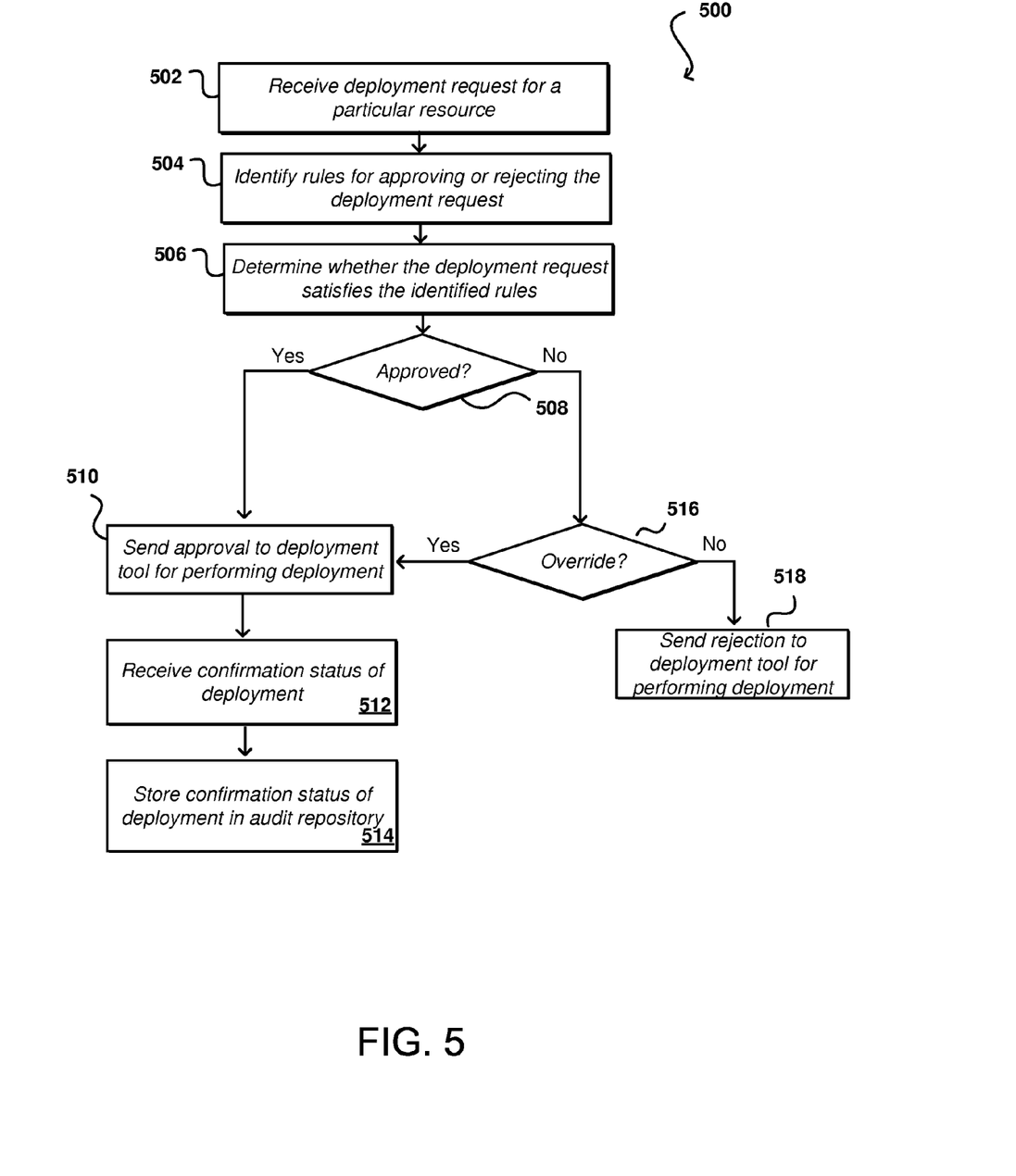
FIG. 5 illustrates an example process for evaluating deployment requests in accordance with various embodiments.

FIG. 5 illustrates an example process 500 for evaluating deployment requests in accordance with various embodiments. It should be understood that, for any process discussed herein, there can be additional, fewer, or alternative steps performed in similar or alternative orders, or in parallel, within the scope of the various embodiments unless otherwise stated. In this example, a deployment approval system receives, from a deployment tool, a deployment request for performing a deployment to a particular resource 502. The deployment approval system can identify at least one rule for approving or rejecting the deployment request based on one or more criteria 504.

The deployment approval system can determine whether the deployment request satisfies the one or more criteria in the at least one rule to approve or reject the request 506. If the deployment request is approved 508, the deployment approval system sends an approval to the deployment tool to perform the deployment 510. The deployment tool can then perform the deployment and, once the deployment is complete, the deployment approval system can receive a confirmation of the deployment 512. The deployment approval system can then store data describing the deployment in an audit repository 514.

If the deployment request is not approved 508, the deployment approval system determines whether an override for the at least one rule has been created 516. If an override for the at least one rule has been created, the deployment approval system sends an approval to the deployment tool to perform the deployment 510. The deployment tool can then perform the deployment and, once the deployment is complete, the deployment approval system can receive a confirmation of the deployment 512. The deployment approval system can then store data describing the deployment in an audit repository 514. However, if an override does not exist, then the deployment approval system sends a rejection to the deployment approval tool for performing the deployment.

Figure 6:
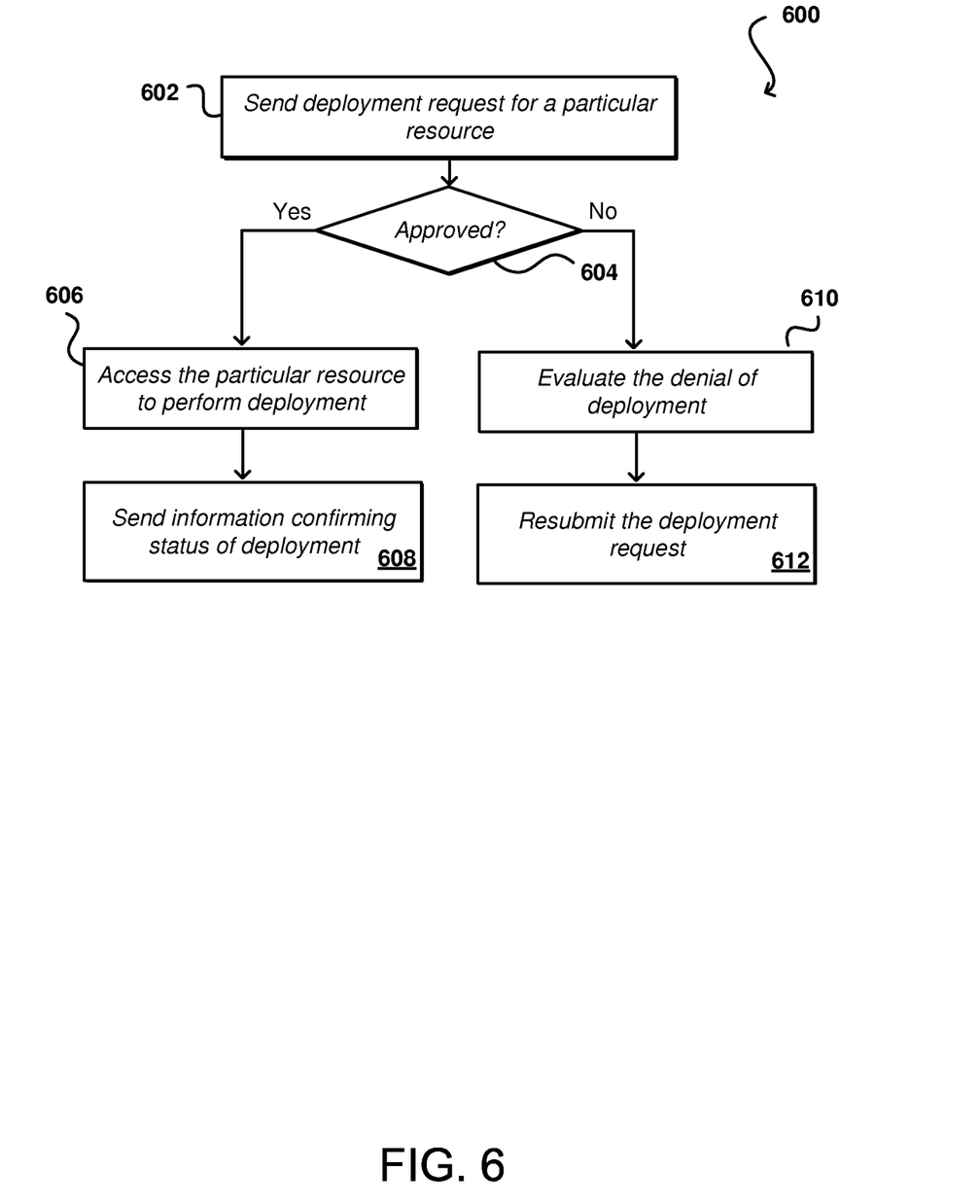
FIG. 6 illustrates an example process for submitting deployment requests in accordance with various embodiments.

FIG. 6 illustrates an example process 600 for submitting deployment requests in accordance with various embodiments. It should be understood that, for any process discussed herein, there can be additional, fewer, or alternative steps performed in similar or alternative orders, or in parallel, within the scope of the various embodiments unless otherwise stated. In this example, a deployment tool sends, to a deployment approval system through at least one application programming interface (API), a deployment request for performing a deployment to a particular resource 602. The deployment can include a payload that is configured to mutate an aspect of the particular resource.

If the deployment approval system approves the request 604, then the deployment approval tool can access the particular resource to perform the deployment 606. Approval for the deployment request can be determined based at least in part on at least one rule for approving or rejecting the deployment based on one or more criteria. Once the deployment is complete, the deployment approval tool can send information confirming the status of the deployment 608.

However, if the deployment approval system does not approve the request 604, then deployment approval system can send the deployment tool with information indicating why the request was rejected, including a listing of rules that the deployment request failed to satisfy. An authorized entity can evaluate the denial information to determine how to satisfy the rules 610. Based on the evaluation, the authorized entity can configure the deployment tool to address the denial and to resubmit the deployment request to the deployment approval system for another attempt at obtaining approval 612.

Figure 7:
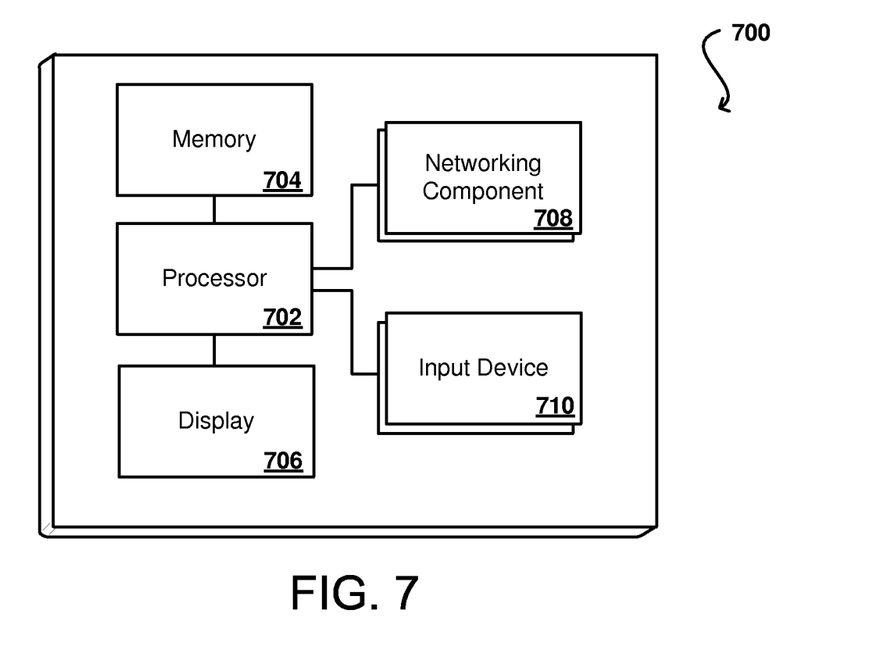
FIG. 7 illustrates a set of components of an example computing device that can be used to perform aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
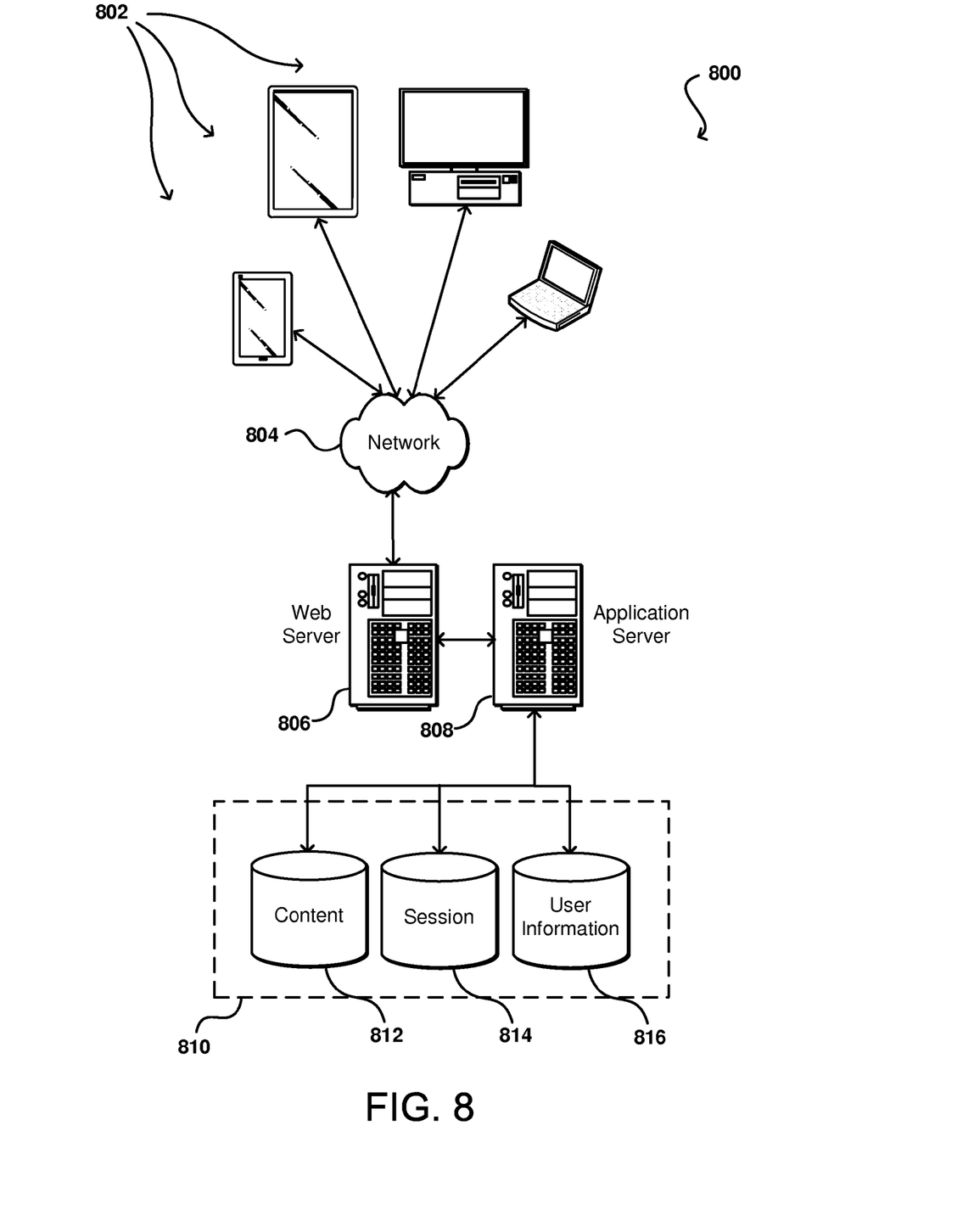
FIG. 8 illustrates an example environment in which aspects of various embodiments can be performed.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory including instructions that, when executed by the at least one processor, cause the system to:
receive, through an application programming interface (API) and from a deployment tool, a first request for performing a first deployment to a particular resource and a second request for performing a second deployment to the particular resource, wherein each deployment includes a payload that is configured to mutate an aspect of the particular resource;
determine, based on the request, that both the first deployment request and the second deployment request are attempting to perform respective deployments on the particular resource;
identify at least one rule for approving or rejecting deployments that are directed to the particular resource, the at least one rule based at least in part upon a geographic region of the particular resource;
determine that the first deployment request satisfies the at least one rule based at least in part upon the geographic region of the particular resource;
send, to the deployment tool, an approval for performing the first deployment, the approval including a token usable to access the particular resource to perform the deployment, wherein access rights of the token are based on an entity associated with the deployment;
determine that the second deployment request does not satisfy the at least one rule; and
send, to the deployment tool, a denial for performing the second deployment, wherein, in response to the denial, the deployment tool is prevented from being able to perform the second deployment to the particular resource.

2. The system of claim 1, wherein the instructions when executed further cause the system to:
  receive, through a graphical user interface or an application programming interface (API), data describing the at least one rule for approving or rejecting deployments that are directed to the particular resource; and
  store the at least one rule to a rules repository, the rules repository storing a plurality of rules.

3. The system of claim 1, wherein the instructions when executed further cause the system to:
  receive, through the application programming interface (API) and from the deployment tool, data describing a confirmation that the first deployment targeting the particular resource has completed successfully; and
  store the data describing the confirmation in an audit repository, the audit repository storing audit information for a plurality of deployments.

4. The system of claim 1, wherein the at least one rule includes criteria for approving the deployment request based on at least one of the following: the deployment occurring within an acceptable time frame, the deployment satisfying one or more dependency conditions, the deployment being requested by an authorized user, or the deployment satisfying one or more threshold system- or network-based metric thresholds.

5. A computer-implemented method, the method comprising:
  receiving, through an application programming interface (API) and from a deployment tool, a deployment request for performing a deployment to a particular resource, wherein each deployment includes a payload that is configured to mutate an aspect of the particular resource;
  identifying at least one rule for approving or rejecting the deployment request based on one or more criteria, the one or more criteria including a geographic region of the particular resource;
  determining that the deployment request satisfies the one or more criteria in the at least one rule based at least in part upon the geographic region of the particular resource; and
  sending, through the API to the deployment tool, an approval for performing the deployment, the approval including a set of credentials usable to access the particular resource to perform the deployment, wherein access rights of the set of credentials are based on an entity associated with the deployment.

6. The computer-implemented method of claim 5, wherein the set of credentials i) authorizes the deployment tool to access the particular resource to perform the deployment or ii) authorizes a user operating the deployment tool to access the particular resource to perform the deployment.

7. The computer-implemented method of claim 5, wherein the one or more criteria for approving or rejecting the deployment is based at least on one of the following: a name of the deployment tool requesting the deployment, a name or reference to the particular resource, a payload that is configured to mutate an aspect of the particular resource, a time period during which the deployment is to occur, a geographic region associated with the particular resource, a zone associated with the particular resource, or an access level of a deployment technician that is requesting the deployment.

8. The computer-implemented method of claim 5, further comprising:
  receiving, from the deployment tool, a second deployment request for performing a second deployment to the particular resource;
  identifying a particular rule for approving or rejecting the second deployment;
  determining an override for the particular rule that was received from an authorized entity; and
  approving or rejecting the second deployment request without evaluating the particular rule.

9. The computer-implemented method of claim 5, wherein the at least one rule includes instructions for restricting performing the deployment to one geographic region at a time, and wherein the particular resource is in a first geographic region, the method further comprising:
  receiving, from the deployment tool, a second deployment request for performing the deployment to a second resource in a second geographic region;
  identifying the at least one rule for approving or rejecting the deployment;
  determining that the second deployment request to the second resource in the second geographic region does not satisfy the at least one rule; and
  sending, to the deployment tool, data describing a denial for performing the second deployment to the second resource, wherein the data describing a denial includes information providing reasons for the denial including a description of the at least one rule that the second deployment request did not satisfy, and wherein, in response to the denial, the deployment tool is prevented from being able to perform the second deployment at least until the deployment to the particular resource is complete.

10. The computer-implemented method of claim 5, wherein the at least one rule includes instructions for restricting the deployment to a particular time period, and wherein determining that the deployment request satisfies the one or more criteria in the at least one rule further comprises:
  determining that the deployment is scheduled to occur within the particular time period; and
  determining that the deployment satisfies the at least one rule.

11. The computer-implemented method of claim 5, wherein the at least one rule includes instructions for approving the deployment based on at least one system- or network-based metric threshold, and wherein determining that the deployment request satisfies the one or more criteria in the at least one rule further comprises:
  determining that a corresponding system- or network-based metric associated with the particular resource satisfies the at least one system- or network-based metric threshold; and
  determining that the deployment satisfies the at least one rule.

12. The computer-implemented method of claim 5, wherein the at least one rule includes instructions for approving the deployment based at least in part on a successful completion of a second deployment, and wherein determining that the deployment request satisfies the one or more criteria in the at least one rule further comprises:
  determining that the second deployment has successfully completed; and
  determining that the deployment satisfies the at least one rule.

13. The computer-implemented method of claim 5, further comprising:

receiving, from the deployment tool, data describing a confirmation that the deployment has completed successfully; and storing the data describing the confirmation in an audit repository, the audit repository storing audit information for a plurality of deployments.

14. The computer-implemented method of claim 5, further comprising:

receiving, through a graphical user interface or an application programming interface (API), data describing the at least one rule for approving or rejecting deployments that target a particular resource; and storing the at least one rule to a rules repository, the rules repository storing a plurality of rules.

15. A non-transitory computer readable storage medium storing instructions, the instructions when executed by a processor causing the processor to:

send, to a deployment approval system and through at least one application programming interface (API), a deployment request for performing a deployment to a particular resource, wherein the deployment includes a payload that is configured to mutate an aspect of the particular resource;

receive, from the deployment approval system, an approval for performing the deployment to the particular resource, wherein the approval includes at least one credential having access rights based on an entity associated with the deployment, and wherein the approval for the deployment request is determined based at least in part on at least one rule for approving or rejecting the deployment based on one or more criteria, at least one rule based at least in part upon a geographic region of the particular resource;

access the particular resource to perform the deployment using the at least one credential; and send, to the deployment approval system and through the at least one application programming interface (API), information confirming that the deployment was successful.

16. The non-transitory computer readable storage medium of claim 15, wherein the instructions further comprise to:

send, to the deployment approval system and through the at least one application programming interface (API), a second deployment request for performing a second deployment to the particular resource; and receive, from the deployment approval system, data describing a denial for performing the second deployment, wherein, in response to the denial, the particular resource is unable to be accessed to perform the second deployment.

17. The non-transitory computer readable storage medium of claim 16, wherein the data describing the denial includes information providing reasons for the denial including a description of at least one rule that the second deployment request did not satisfy.

18. The non-transitory computer readable storage medium of claim 17, wherein the instructions further comprise to:

receive, from the deployment approval system, an indication that the at least one rule has been satisfied;

send, to the deployment approval system and through the at least one application programming interface (API), the second deployment request for performing the second deployment to the particular resource;

receive, from the deployment approval system, an approval for performing the second deployment to the particular resource, wherein the approval includes at least one credential;

access the particular resource to perform the deployment using the at least one credential; and send, to the deployment approval system and through the at least one application programming interface (API), information confirming that the second deployment was successful.

19. The non-transitory computer readable storage medium of claim 15, wherein the at least one credential comprises a one-time password (OTP) that is configured to grant access to the particular resource for a particular time period.

20. The non-transitory computer readable storage medium of claim 15, wherein the at least one credential comprises a token that is configured to grant access to the particular resource, wherein the instructions further comprise to:

determine that the deployment to the particular resource was successful; and send the token to the deployment approval system, wherein the deployment approval system is able to provide the token to authorize a different deployment tool to perform a different deployment.

\* \* \* \* \*